No. 873,482. PATENTED DEC. 10, 1907.
F. B. ANDERSON.
FILTER PRESS.
APPLICATION FILED SEPT. 4, 1907.
4 SHEETS—SHEET 1.
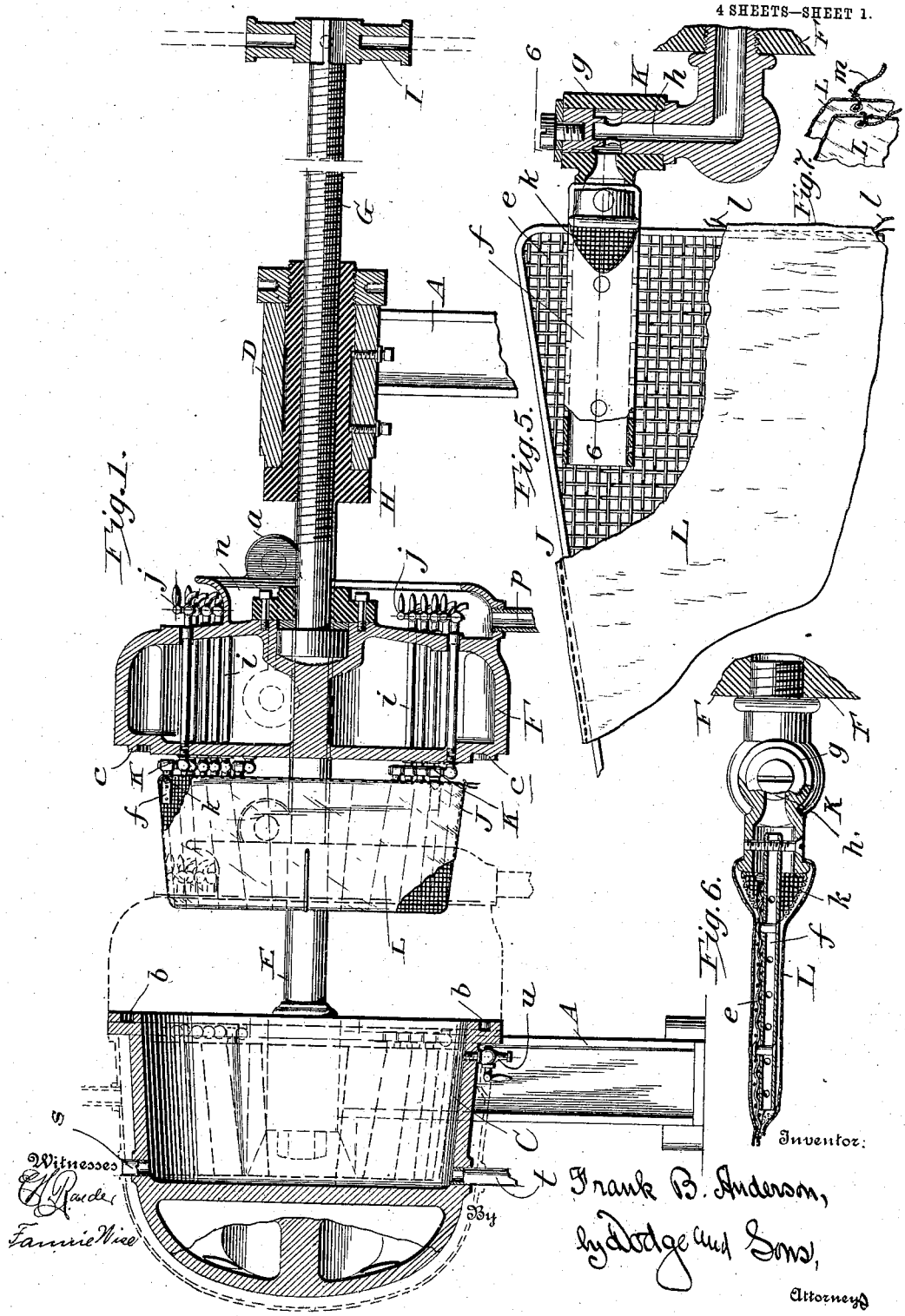
Inventor:
Frank B. Anderson,
by Dodge and Sons,
Attorneys
Witnesses

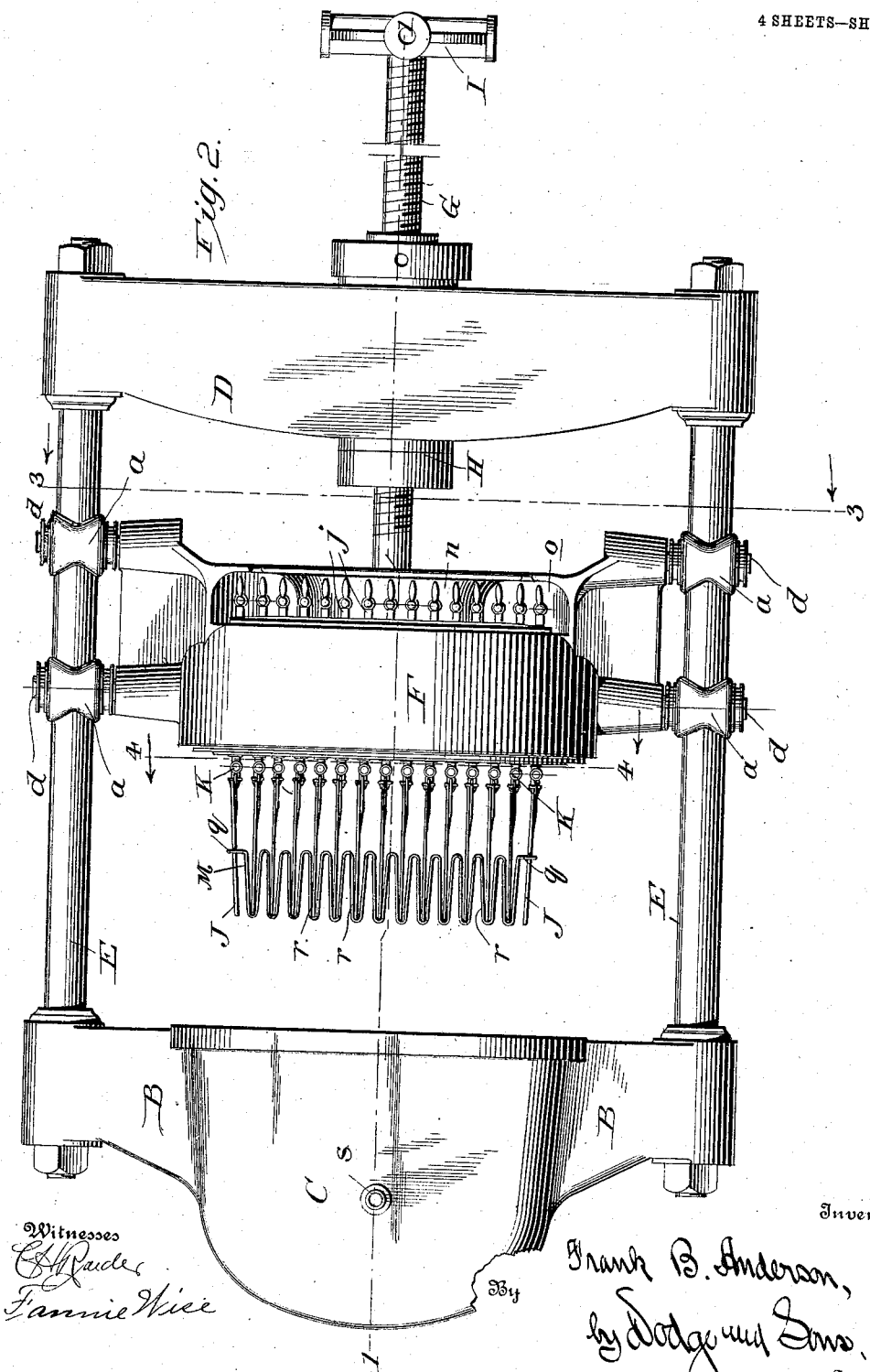

No. 873,482.
PATENTED DEC. 10, 1907.
F. B. ANDERSON.
FILTER PRESS.
APPLICATION FILED SEPT. 4, 1907.
4 SHEETS—SHEET 3.
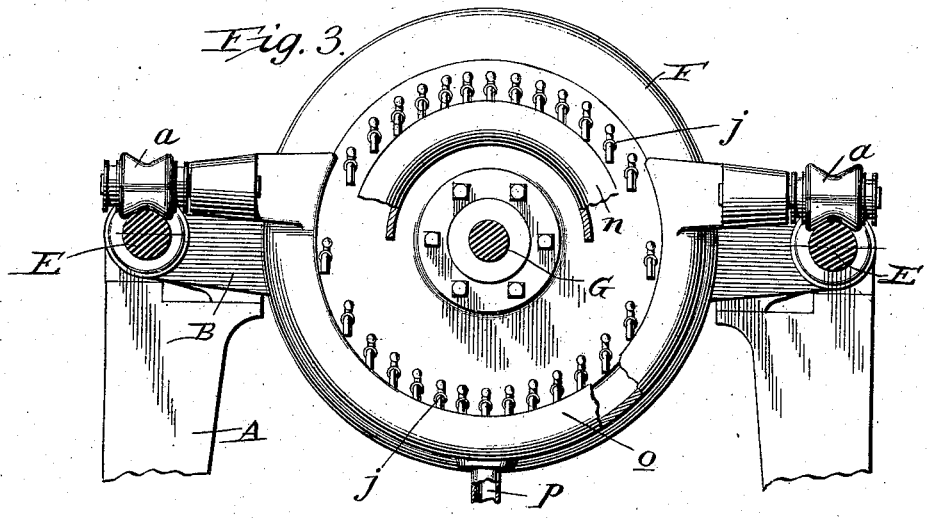
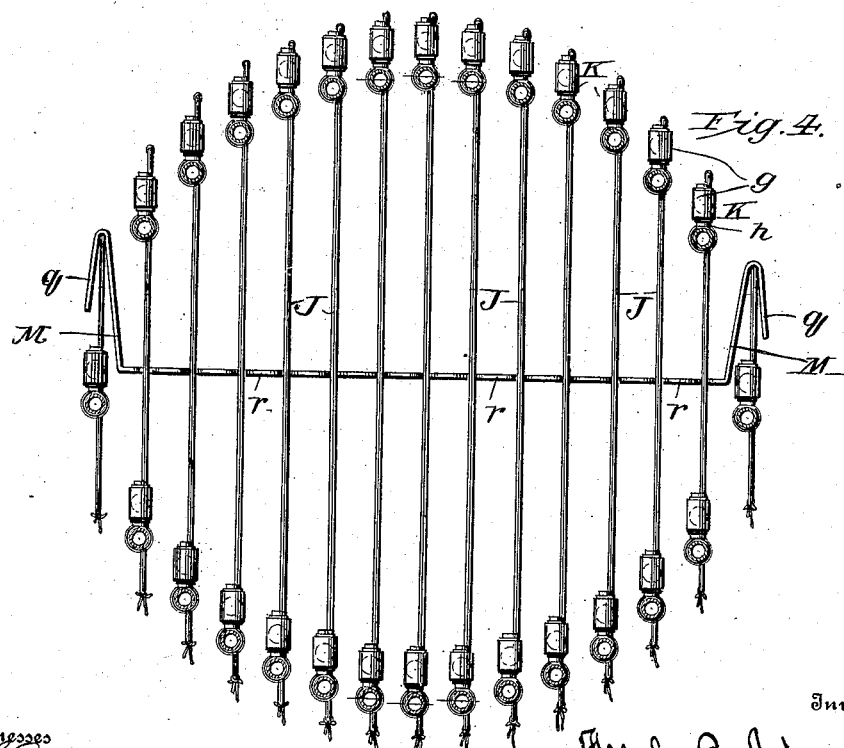

No. 873,482.
PATENTED DEC. 10, 1907.
F. B. ANDERSON.
FILTER PRESS.
APPLICATION FILED SEPT. 4, 1907.
4 SHEETS—SHEET 4.
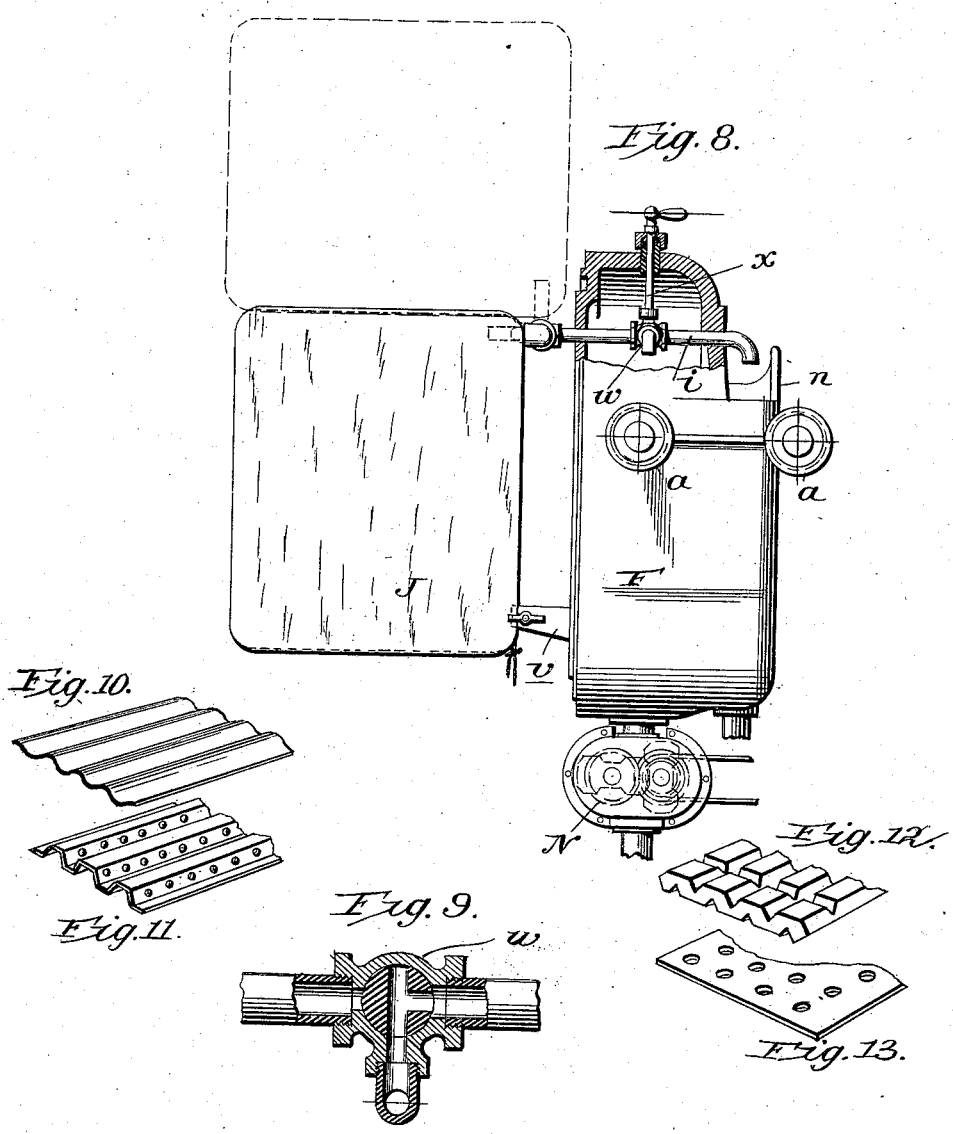

UNITED STATES PATENT OFFICE.

FRANK B. ANDERSON, OF CLEVELAND, OHIO.

FILTER-PRESS.

No. 873,482.　　　Specification of Letters Patent.　　　Patented Dec. 10, 1907.

Application filed September 4, 1907. Serial No. 391,387.

*To all whom it may concern:*

Be it known that I, FRANK B. ANDERSON, a citizen of the United States, residing at Cleveland, in the county of Cuyahoga and State of Ohio, have invented certain new and useful Improvements in Filter - Presses, of which the following is a specification.

This invention pertains to filter presses, or to that class of presses in which a mixture of solid and liquid substances is subjected to fluid pressure to force out through a suitable filtering medium the liquid portion of the charge.

The objects sought are a more rapid and efficient separation of the liquids from the solids, facility of cleaning the filtering surfaces and removing the solid matters, protection of the filtering cloths against cutting, tearing or other injury, and consequent economy in the use of presses of this general character.

In the accompanying drawings: Figure 1 is a longitudinal vertical section on the line 1—1 of Fig. 2, with portions of the frame broken away; Fig. 2, a top plan view of the press with the screw stem partially broken away to bring it within the available space of the drawing sheet; Fig. 3, a section on the line 3—3 of Fig. 2, looking in the direction of the arrow; Fig. 4, a section on the line 4—4 of Fig. 2, looking in the direction of the arrow; Fig. 5, an enlarged view, mainly in section, of a portion of one of the filtering leaves or plates with the filtering cloth partially broken away; Fig. 6, a section on the line 6—6 of Fig. 5; Fig. 7, a detail view, showing one mode of securing the filtering cloth; Fig. 8, a view illustrating a modified mounting of the filter plates, so that they may be swung vertically to and from operative position, each without interference with others; Fig. 9, a detail of the three-way valve; Figs. 10, 11, 12 and 13 views illustrating different forms of the filter plate.

While the press is designed primarily for use with fluid pressure to force the material into and through the press, suction or vacuum may be employed, the atmosphere in such case affording the requisite pressure. So too, while cloths will ordinarily constitute the filtering medium, paper and other well known media may be used, either with the cloths or alone.

Filter presses, as hitherto generally constructed, have been provided with a series of plates of perforate or foraminous construction, alternating with sheets of filtering cloth, the substances to be treated being introduced under pressure into one end of the chamber containing the filtering plates, and forced under pressure through the successive plates and filtering cloths. Practical difficulties have been experienced with such construction, notably in that the cloths being usually clamped between the plates and subjected to the total pressure necessary to force the liquid through the entire series of filtering plates, are rapidly destroyed, being frequently cut or torn both in the clamping operation and by reason of the pressure applied. The cost of cloths is a material item of expense, and to lessen the wear and injury of the cloths is, therefore, a primary object of the present invention. This I accomplish in a very marked degree by making each filter plate or section with its filtering cloth independent of the others; applying the cloth to each in the form of a bag which completely envelops the plate, and lies in use against the faces thereof, the liquid filtering through each plate or leaf and its cloth, being independently carried off and delivered outside of the press. Each cloth is readily removable without disturbing any other cloth, and without removing or disconnecting its supporting plate or leaf, or any of its connections.

In the event of injury to any cloth or its supporting plate, the outlet or outlets communicating therewith may be closed, and the press used regardless of such injury. The entire group or series of plates or leaves may be quickly withdrawn from the shell or casing, and being hinged can be readily separated to facilitate removal of the solid matters accumulating between them.

The various features of construction will be readily understood upon referring to the drawings, in which I have illustrated a simple and efficient embodiment of the invention, the press here shown being of single form, though obviously by extending the frame and making the containing shell double, or with two sections opening in opposite directions and duplicating the heads with their filter plates, controlling screw, etc., one frame of suitable length may be utilized for two presses, or for a double press.

In these drawings is shown a frame-work comprising suitable standards A; a cross head B formed or furnished with a shell or casing C, which is represented and is preferably made of tapering or conical form, braced or trussed on the outside or outer end to give adequate strength; and a cross-beam D, the cross head B and member D being connected by tie-rods E, shown in Figs. 2 and 3.

The tie-rods E not only serve to brace and connect the members B D, but also as supporting rails or tracks to receive truck wheels or rollers $a$ of a head F, which with the shell C, constitutes the pressure chamber.

As shown in Fig. 1, the shell C is formed with an annular recess or channel $b$ in its end face to receive an annular flange or rib $c$ formed on the face of head F, the two parts interlocking to properly center the head and make a close joint between the shell and the head, a packing gasket being usually introduced into the channel $b$ to insure a close and liquid-tight joint. The head F has its end face protruded somewhat beyond the flange $c$ so as to enter the mouth or open end of the shell C, and further produce a close joint between the parts.

Head F is shown of hollow or trussed construction, this being for the purpose, primarily, of giving it adequate strength. It may also serve to receive steam or other heating agent, and this is true of the hollow or trussed head of the shell C. Either or both parts may be jacketed, if desired, for a like purpose, such jacket being indicated in dotted lines in Fig. 1 on the shell portion.

The head F, as shown in Fig. 2, has lateral arms from which project stud axles or journals $d$, on which are mounted the rollers $a$ above referred to, these rollers resting and traveling upon the tie-rods E, serving to sustain the head F, and to cause it to move truly to position concentric with the shell C. The traverse of the head upon the tie-rods E is effected by means of a screw G passing through a nut H in the cross-bar D.

A wheel or spider I secured upon the squared end of the screw stem and provided with sockets, serves to receive hand spikes or levers by which to turn the screw, and to force the head F into close contact with the shell C or to withdraw it therefrom as required, the inner end of the screw being swiveled in the head F as shown in Fig. 1.

J indicates a filter plate, of which a series is employed, each comprising a supporting body $e$ of wire screen or netting, which may advantageously be made of what is known as No. 9 mesh—17 wire mining cloth. This, however, is suggested only as a suitable material for which may be substituted corrugated, grooved, channeled, or perforated metal plates, such as indicated in Figs. 10, 11 12 and 13, or wire screen or netting of different mesh and different weight of wire. This will depend largely upon the character of the substances. The wire netting is advisably framed or bound as indicated in Fig. 5 to give it the necessary support and strength.

Each plate has riveted or otherwise secured to it a flattened tube or tubes $f$, each open at its ends, and perforated along its edges, as shown in Figs. 5 and 6. The tube projecting beyond the edge or binding of the netting or plate is secured to, or formed with, the sleeve member $g$ of a swivel bracket or coupling K similar to that of a swinging gas bracket, or in other words, of such construction as to permit the leaf to swing about the tubular stem $h$ of the bracket while maintaining always communication between the interior of the tube $f$ and the interior of the stem $h$.

From each stem $h$ a pipe $i$ extends to the outer or rear face of head F where it is furnished with a cock or faucet $j$ by which to open or close communication between the tubes $f$ and the outside of the press. In practice two of these hinge brackets or connections are used for each filtering plate, leaf, or member, though a single one might be used if made of sufficient length to give adequate support, or more than two might be used.

In Figs. 5 and 6 the tube $f$ is shown as extending into the annular neck of the sleeve member $g$ of the hinge or bracket connection K. To close or protect the open mouth of this annular neck, wire gauze $k$ is applied, as shown in Figs. 5 and 6. This forms a convenient and comparatively inexpensive construction of the tubular hinge joint, since ordinary gas pipe fittings may be employed for the purpose, but any common and well known joint of analogous character may be employed.

L indicates the filtering cloth which is made in the form of a flat bag somewhat narrower at its bottom or closed end than at the top, to conform to the outline of the plate or leaf J over which it is drawn, and to which it is secured either by a puckering string $l$ (Fig. 5), or by tie strings or tapes $m$ (Fig. 7). Other simple and convenient fastenings permitting ready detachment of the cloth may, of course, be employed.

As shown in Figs. 1, 2 and 3, the head F is formed with a semi-circular trough $n$ above the screw G, and with a second semi-circular trough $o$ below the screw, the upper of these troughs serving to receive the oil or other liquid flowing from the cocks $j$ above the screw and to direct it into the lower trough, and said lower trough serving to collect all the liquid delivered by the cocks $j$, both those above and those below the screw, and to direct it to a common outlet $p$, Figs. 1 and 3.

The plates or leaves J being constructed and covered as above set forth and supported by the hinge brackets K, may be swung about their hinge axes to bring them into proper and relatively close relation, as shown in Figs. 2 and 4, preparatory to introduction within the shell C, or they may be swung apart so as to give free access to both faces of each for the convenient and complete removal of solid matters lying between them, or adhering to their faces. For the purpose of spacing the plates or leaves and holding them in proper relation while being inserted and removed, any convenient spacing device may be employed. A simple form of separator M is shown in Figs. 2 and 4, consisting merely of a heavy wire having hook-like arms $q$ to hang upon the upper edges of the outer plates, and a reversely bent or comb-like intermediate portion $r$ with fingers or loops to enter between each two proximate plates.

The parts being constructed as above set forth, the screw G is turned to bring the head F into close contact with the shell C, or to properly compress the packing gasket between them. The material to be treated is then introduced into the shell C through inlet openings $s$ and $t$, either or both, being forced therein under pressure sufficient to cause the liquid portions to find their way through the filtering cloth into the tubes $f$, and finally out through the cocks $j$, the solid matters being held back by the filtering cloth upon the foraminous leaves or plates which support them. The pressure may be afforded by pump, or by the introduction of air, steam or gas under suitable head or pressure. In the latter case one of the openings $s$ or $t$ may be used for the introduction of the mingled solid and fluid substances, and the other for the pressure fluid.

After the press is used for a time the accumulation of solid matters within the shell becomes such as completely to fill the space between and around the plates, and to pack very tightly within the shell. The conical or tapering form of the shell and plates facilitates the withdrawal of the head F and solid mass of material, as will be readily understood.

Despite the high pressure to which the material is subjected there will be at the end of the operation a small quantity of liquid matter at the lower side of the shell. To prevent this falling upon the floor when the head F is withdrawn, I provide a draw-off cock or tube $u$ at or about the lowest point in the shell, which being opened in advance of withdrawal of the head F permits this accumulation of liquid to be withdrawn into a suitable receptacle.

In order that the body formed by the group of filter plates may conform generally to the interior of the shell or casing, the plates are made of progressively less width from the middle of the series to the sides thereof, and the taper is varied accordingly. This will be readily understood upon referring to Figs. 1 and 4, in which latter the parts are shown on a larger scale than in Figs. 1 and 2. The body made up by the plates is somewhat smaller than the interior of the shell or casing so as to leave an annular space between the two, and this space may be somewhat wider on the lower than on the upper side. This, however, is a mere matter of detail, variable at will. Any other convenient and well known means of forcing and holding the movable member toward and against the stationary member may be employed.

In Fig. 8 I have shown the leaves or plates arranged side by side as before, but adapted to swing vertically. This arrangement is advantageous in that any plate of the series may be thrown up without in any manner disturbing any other of the series. A rib or abutment $v$ arrests the plates in their descent, and maintains them in proper position. In this figure I have also shown each pipe $i$ provided with a three-way cock $w$ having a rod or stem $x$ extending from its plug to the exterior of the shell, so that any cock may be closed, opened in line with the bore of the pipe, or opened to the interior of the head F; and I have also shown a vacuum pump N connected with the interior of the head. This arrangement permits the apparatus to be used with pressure or suction at will, upon suitably adjusting the cock plugs.

While the press is shown in a horizontal position it is to be understood that it may be used in any position. Under some conditions it may be advantageous to have it stand in a vertical position. It is to be understood also that the press may be made of form other than that shown; that is to say, instead of being circular it may be rectangular or of other shape.

Having thus described my invention, what I claim is:

1. A filter press comprising in combination, a frame; a shell or casing mounted in or upon said frame; a head or closure for said shell or casing movable toward and from the latter; a series of independent plates or leaves carried by the head; pipes or outlets communicating with the respective plates or leaves, and filtering cloths applied to said plates or leaves, substantially as described.

2. In a filter press, the combination of a suitable supporting frame; a shell or casing carried thereby; a head or closure movable toward and from the shell or casing, and adapted to make close connection therewith; a series of plates or leaves independently hinged to said head; filter cloths applied to the respective plates or leaves; and pipes or outlets communicating with the respective plates and extending to the outside of the head, whereby each plate and cloth is rendered capable of performing its filtering operation independently of the others.

3. In a filter press, the combination of a frame; a shell or casing and a head or closure for said shell or casing, both carried by said frame, and one movable toward and from the other; a series of plates or leaves carried by the head; independent filter cloths applied to the respective plates or leaves, and pipes or outlets extending from the respective plates or leaves to the exterior of the head, substantially as described.

4. In a filter press, the combination of a shell or casing; a head or closure therefor; independent plates carried by the head or closure, and bag-like filter cloths adapted to be drawn over and secured to the respective plates or leaves, and to be removed therefrom without dismounting or disturbing the devices supporting the leaves or plates, or connecting them with the head.

5. In a filter press, the combination of a shell or casing; a head or closure therefor, one movable toward and from the other; a series of plates or leaves hinged or jointed to the head, and adapted to be swung to and from operative position; and filtering cloths applied to said leaves.

6. In a filter press, the combination of a frame having horizontal tie-bars or rods; a shell or casing and a head or closure therefor, both carried by said frame, one of said parts being provided with truck wheels or rollers to rest upon and traverse the tie-rods, whereby it is adapted for convenient movement toward and from the other of said parts; a screw for adjusting the movable member toward and from the companion member; plates or leaves carried by the head or closure; filter cloths covering said plates or leaves; pipes or outlets extending from each plate or leaf to the exterior of the head, and cocks or faucets applied to said pipes, substantially as set forth.

7. In a filter press, the combination of a shell or casing; a head or closure for said casing, one of said parts movable toward and from the other; plates or leaves carried by the head; filter cloths applied to said plates; pipes or outlets extending from each plate to the exterior of the head; cocks or faucets applied to said pipes; and troughs beneath said cocks to collect liquid delivered thereby, and deliver the same to a common outlet.

8. In a press of the character described, and in combination with the filter plates thereof, a separator consisting of a bent wire or rod having a hook or hooks to engage over a filter plate or plates, and loops or fingers to enter between the plates, substantially as described.

9. In a filter press, the combination with a supporting frame, of a shell or casing having an open end or mouth, and of conical or tapering form; a head or closure for said shell, and a series of filter plates carried by the head, tapering to correspond generally to the taper of the shell or casing, the successive plates being of decreasing width from the middle to the outside of the series, whereby the group of plates is caused to correspond approximately in form to the form of the shell or casing.

10. In a filter press, and in combination with a shell or casing, a head or closure therefor; a series of filter plates; and a series of tubular hinge connections uniting said plates with the head or closure, and adapted to carry from the casing the liquid filtered from its contents.

11. In a filter press, the combination of a shell or casing; a hollow head or closure therefor; a series of filter plates; a series of pipes extending one from each plate into the interior of the hollow head; three-way cocks applied to said pipes, one to each; and a suction device in communication with the interior of the head.

In testimony whereof I have signed my name to this specification in the presence of two subscribing witnesses.

FRANK B. ANDERSON.

Witnesses:
CHARLES W. TOLAND,
RALPH BLUE.